United States Patent
Kashihara et al.

(10) Patent No.: US 7,019,080 B2
(45) Date of Patent: Mar. 28, 2006

(54) BINDER RESIN SOLUTION COMPOSITION, COATINGS, INKS, ADHESIVES AND PRIMERS

(75) Inventors: Kenji Kashihara, Takasago (JP); Tetsuji Nishioka, Takasago (JP); Tatsuo Tsuneka, Takasago (JP); Shoji Maekawa, Takasago (JP); Isao Wada, Sodegaura (JP)

(73) Assignees: Toyo Kasei Kogyo Company Limited, Osaka (JP); Mitsui Chemicals, Inc., Tokyo (JP)

( * ) Notice: Subject to any disclaimer, the term of this patent is extended or adjusted under 35 U.S.C. 154(b) by 51 days.

(21) Appl. No.: 10/482,054

(22) PCT Filed: Jun. 26, 2002

(86) PCT No.: PCT/JP02/06378

§ 371 (c)(1),
(2), (4) Date: Dec. 29, 2003

(87) PCT Pub. No.: WO03/002659

PCT Pub. Date: Jan. 9, 2003

(65) Prior Publication Data

US 2004/0249074 A1    Dec. 9, 2004

(30) Foreign Application Priority Data

Jun. 29, 2001 (JP) .............................. 2001-199222

(51) Int. Cl.
*C08L 23/12* (2006.01)

(52) U.S. Cl. ....................... 525/240; 525/292; 525/301

(58) Field of Classification Search ................ 525/240, 525/292, 301
See application file for complete search history.

(56) References Cited

U.S. PATENT DOCUMENTS 5,986,009 A * 11/1999 Thoen et al. ................ 525/232
6,277,912 B1 * 8/2001 Ashihara et al. .............. 525/65

FOREIGN PATENT DOCUMENTS

| | | |
|---|---|---|
| JP | 46-27489 | 8/1971 |
| JP | 50-35445 | 11/1975 |
| JP | 50-37688 | 12/1975 |
| JP | 63-36624 B2 | 7/1988 |
| JP | 63-50381 B2 | 10/1988 |
| JP | 6-306227 A | 11/1994 |
| JP | 7-18016 A | 1/1995 |
| JP | 10-168123 A | 6/1998 |
| JP | 10-259367 A | 9/1998 |
| JP | 11-315185 A | 11/1999 |
| JP | 2001-114961 A | 4/2001 |

* cited by examiner

Primary Examiner—James J. Seidleck
Assistant Examiner—Olga Asinovsky
(74) Attorney, Agent, or Firm—Kubovcik & Kubovcik

(57) ABSTRACT

The present invention provides a binder resin solution composition, and a coating, ink, and adhesive containing the composition as an active ingredient, the binder resin solution composition having a solid content of 10 to 50 wt. % and comprising (a) a chlorinated polyolefin prepared by chlorinating an isotactic polypropylene polymer having a molecular weight distribution of no more than 3 and a melting point measured by a differential scanning calorimeter of 110 to 140° C. to a chlorine content of 10 to 40 wt. % and, (b) an organic solvent.

26 Claims, No Drawings

BINDER RESIN SOLUTION COMPOSITION, COATINGS, INKS, ADHESIVES AND PRIMERS

TECHNICAL FIELD

The present invention relates to a binder resin composition used to protect or decorate products of polyolefin resins such as polypropylene, polyethylene, ethylene-propylene copolymers, and ethylene-propylene-diene copolymers. More particularly, the present invention relates to a binder resin solution composition that is excellent in adhesion to sheets, films, molded articles and the like made from the aforementioned polyolefin resins and in solvent resistance; has excellent low-temperature flowability; and is used for coatings, primers, printing inks, or adhesives.

BACKGROUND ART

Generally, polyolefin resins are relatively inexpensive and have noteworthy properties such as chemical resistance, water resistance, heat resistance, etc., and therefore used in a wide variety of applications for automotive parts, electronic parts, building materials, food packaging films, and the like. However, since polyolefin resins having such remarkable properties are crystalline and non-polar, it is difficult to coat or bond products made of the resins.

Weakly chlorinated polyolefins exhibiting strong adhesion to polyolefin resins have been used as binder resins to coat or bond such low-adhesion polyolefin resins. For example, Japanese Examined Patent Publication No. 27489/1971 proposes an isotactic polypropylene chlorinated to have a chlorine content of 20 to 40 wt. % as a printing ink binder resin for polypropylene films. Japanese Examined Patent Publication Nos. 35445/1975 and 37688/1975 teach propylene-ethylene copolymers chlorinated to 20 to 40 wt. % as binder resins for printing inks and adhesives used on polyolefins.

Moreover, Japanese Examined Patent Publication Nos. 50381/1988 and 36624/1988 propose, as primers or binder resins for coating polyolefin molded articles, weakly chlorinated propylene-α-olefin copolymers with a chlorine content of 5 to 50 wt. % containing a carboxylic acid and/or carboxylic anhydride.

Generally, it is desirable to keep the chlorine content as small as possible since, as the chlorine content increases, such chlorinated polyolefins exhibit reduced solvent resistance and adhesion to polyolefins. However, when the chlorine content is excessively low, properties of the polyolefin solution are impaired, thickening or gelating during storage, thereby resulting in significant deterioration in coating workability during spray coating and the like. Even when the chlorine content of the chlorinated polyolefins is maintained within a range such that coating workability during spray coating and the like does not suffer, the chlorinated polyolefin solutions exhibit impaired flowability when stored at low-temperatures, thereby greatly limiting their handling properties at low temperatures such as in winter. Although it is possible to improve low-temperature flowability by keeping the concentration of the weakly chlorinated polyolefin in the solution low, when the concentration is excessively low, problems arise such as difficult pigment dispersion in solvents upon processing into inks and coatings, increased transportation cost, etc.

To overcome such problems, Japanese Unexamined Patent Publication No. 306227/1994 proposes a binder resin solution, as a binder resin solution composition with excellent low-temperature flowability, that is obtained by dissolving a weakly chlorinated polyolefin in an alicyclic hydrocarbon and aromatic hydrocarbon mixed solvent.

However, the use of such a mixed solvent requires complex process in production, resulting in high cost. Moreover, for example, when the mixed solvent is used as a part of the primer component for coating, upon blending with a solvent-dispersed resin, its low-temperature flowability is impaired due to the change in chemical composition of the solvent. Therefore, it is hardly a fundamental solution to the aforementioned problems.

DISCLOSURE OF THE INVENTION

An object of the invention is to provide a binder resin solution composition for use in coatings, primers, printing inks, or adhesives, without impairing the low-temperature flowability and workability of weakly chlorinated polyolefins, the composition having excellent solvent resistance and outstanding adhesion to polyolefin products.

Other objects and characteristics of the present invention will become evident by the disclosure provided hereinbelow.

The inventors conducted extensive research and found that a binder resin solution composition obtained by dissolving a chlorinated polyolefin prepared by chlorinating an isotactic polypropylene polymer having a specific molecular weight distribution and melting point in an organic solvent imparts excellent low-temperature flowability and workability and exhibits excellent adhesion to polyolefin products and solvent resistance. The present invention has been accomplished based on such findings.

In other words, the present invention provides a binder resin solution composition, coating, ink, adhesive, and primer as described below.

1. A binder resin solution composition having a solid content of 10 to 50 wt. % comprising (a) a chlorinated polyolefin prepared by chlorinating to a chlorine content of 10 to 40 wt. % an isotactic polypropylene polymer having a molecular weight distribution of no more than 3 and a melting point measured by a differential scanning calorimeter of 110 to 140° C. and (b) an organic solvent.

2. A binder resin solution composition having a solid content of 10 to 50 wt. % comprising (a) a carboxyl-containing chlorinated polyolefin prepared by chlorinating to a chlorine content of 10 to 40 wt. % an isotactic polypropylene polymer having a molecular weight distribution of no more than 3 and a melting point measured by a differential scanning calorimeter of 110 to 140° C. to produce a chlorinated polyolefin and graft-polymerizing with the chlorinated polyolefin 1 to 10 wt. % of at least one unsaturated carboxylic acid monomer selected from the group consisting of carboxylic acids and carboxylic acid anhydrides, and (b) an organic solvent.

3. A binder resin solution composition having a solid content of 10 to 50 wt. % comprising (a) a carboxyl-containing chlorinated polyolefin prepared by graft-polymerizing 1 to 10 wt. % of at least one unsaturated carboxylic acid monomer selected from the group consisting of carboxylic acids and carboxylic acid anhydrides with an isotactic polypropylene polymer having a molecular weight distribution of no more than 3 and a melting point measured by a differential scanning calorimeter of 110 to 140° C. to produce a carboxyl-containing polyolefin and chlorinating the carboxyl-containing polyolefin to a chlorine content of 10 to 40 wt. %, and (b) an organic solvent.

4. The binder resin solution composition according to any of Items 1 to 3, wherein the isotactic polypropylene polymer is an isotactic propylene-α-olefin random copolymer.

5. The binder resin solution composition according to any of Items 1 to 3, wherein the isotactic polypropylene polymer is an isotactic propylene-ethylene random copolymer.

6. The binder resin solution composition according to any of Items 1 to 3, wherein the isotactic polypropylene polymer is an isotactic polypropylene.

7. The binder resin solution composition according to any of Items 1 to 6, wherein the isotactic polypropylene polymer is produced in the presence of a metallocene catalyst.

8. A coating for a polyolefin film, sheet or molded article, the coating comprising as an active ingredient the binder resin solution composition according to any of Items 1 to 7.

9. An ink for a polyolefin film, sheet or molded article, the ink comprising as an active ingredient the binder resin solution composition according to any of Items 1 to 7.

10. An adhesive for a polyolefin film, sheet or molded article, the adhesive comprising as an active ingredient the binder resin solution composition according to any of Items 1 to 7.

11. A primer for coating a polyolefin resin, the primer comprising as an active ingredient the binder resin solution composition according to Item 2 or 3.

Examples of the resin components for use in the binder resin solution composition of the present invention include chlorinated polyolefins prepared by chlorinating isotactic polypropylene polymers; carboxyl-containing chlorinated polyolefins prepared by graft-polymerizing unsaturated carboxylic acid monomers with chlorinated polyolefins prepared by chlorinating isotactic polypropylene polymers; carboxyl-containing chlorinated polyolefins prepared by graft-polymerizing unsaturated carboxylic acid monomers with isotactic polypropylene polymers to give carboxyl-containing polyolefins and chlorinating the carboxyl-containing polyolefins.

Examples of isotactic polypropylene polymers used as starting materials include isotactic propylene-α-olefin random copolymers, isotactic polypropylenes, and the like. Preferable are isotactic propylene-α-olefin random copolymers.

Examples of α-olefins in such isotactic propylene-α-olefin random copolymers are those having 2, or 4 to 20 carbons, such as ethylene, 1-butene, 1-pentene, 1-hexene, 1-heptene, 1-octene, 1-decene, 1-dodecene, 1-hexadecene, 4-methyl-1-pentene, and the like; ethylene is preferable. Two types of α-olefins can be used in combination. Examples of ternary random copolymers when 2 types of α-olefins are used include isotactic propylene-ethylene-butene random copolymers. For ease of handling during production, 1-butene may be used in a proportion of no more than 0.5 mol %.

The isotactic polypropylene polymers used as starting materials have a molecular weight distribution (Mw/Mn) of 3 or less as measured by gel permeation chromatography (GPC), and preferably 1 to 2.7.

Furthermore, the isotactic polypropylene polymers used as starting materials have a melting point (Tm) of 110 to 140° C. as measured by a differential scanning calorimeter, and preferably 115 to 135° C. Conditions for measuring the melting point are as follows: A sample (about 5 mg) is heated from room temperature to 240° C. at a rate of 30° C./min and maintained 240° C. for 10 minutes, and temperature is then lowered to 30° C. at a rate of 10° C./min. The melting point refers to the peak maximum temperature.

The isotactic polypropylene polymers used as starting materials preferably have an intrinsic viscosity (η) measured in decalin at 135° C. of 0.1 to 12 dl/g, more preferably 0.3 to 10 dl/g, and especially preferably 0.5 to 5 dl/g.

The isotactic propylene-α-olefin random copolymer as favored herein, when ethylene is used as the α-olefin, preferably has 85.7 to 98.5 mol % (90 to 99 wt. %) of its structural units derived from propylene, more preferably 88.5 to 97.0 mol % (92 to 98 wt. %), and especially preferably 89.9 to 96.0 mol % (93 to 97.3 wt. %), and preferably has 1.5 to 14.3 mol % (1 to 10 wt. %) of its structural units derived from ethylene, more preferably 3.0 to 11.5 mol % (2 to 8 wt. %), and especially preferably 4.0 to 10.1 mol % (2.7 to 7 wt. %).

Isotactic polypropylene polymers usable herein are preferably produced in the presence of a metallocene catalyst.

Metallocene catalysts herein refer to olefin-polymerizing catalysts derived from (A) a metallocene compound and (B) an organo-aluminum-oxy compound, and/or an ionic compound obtained from the aforementioned transition metal compound (A), containing as necessary (C) an organo-aluminum compound. Specifically, the metallocene catalysts include the following 4 types:

(i) A (Metallocene compound)+B (Organo-aluminum-oxy compound);

(ii) Ionic compound obtained from (A+B);

(iii) A+B+C (Organo-aluminum compound); and (iv) Ionic compound obtained from (A+B)+C Examples of metallocene compound (A) as used herein include transition metal compounds represented by Formula (1) below:

$$MLx \qquad (1)$$

In Formula (1), M represents a transition metal that belongs to Group 4A of the periodic table. Specifically, M is zirconium, titanium, or hafnium. X represents the valency of the transition metal.

In Formula (1), L represents ligands that coordinate with the transition metal. At least one of the ligands L has a cyclopentadienyl skeleton, and the ligand having a cyclopentadienyl skeleton may be substituted. When the number of L is 2 or more, ligands can be the same or different. Examples of ligands having a cyclopentadienyl skeleton include cyclopentadienyl, methylcyclopentadienyl, ethylcyclopentadienyl, methylpropylcyclopentadienyl, methylbutylcyclopentadienyl, methylhexylcyclopentadienyl, methylbenzylcyclopentadienyl and like alkyl- or aralkyl-substituted cyclopentadienyl groups as well as indenyl, 4,5,6,7-tetrahydroindenyl, fluorenyl, and like groups. These groups may be substituted with halogen atom(s), trialkylsilyl group(s), or the like.

When the compound represented by Formula (1) has ligand(s) L having 2 or more cyclopentadienyl skeletons, two of the cyclopentadienyl skeletons are preferably bonded by an alkylene such as ethylene, propylene, or the like; a substituted alkylene such as isopropylidene, diphenylmethylene, or the like; a silylene; or a substituted silylene such as dimethylsilylene, diphenylsilylene, methylphenylsilylene, or the like.

Examples of ligands L other than those having a cyclopentadienyl skeleton include $C_{1-12}$ hydrocarbons, alkoxy groups, aryloxy groups, sulfonic acid-containing groups (—$SO_3R^1$: $R^1$ represents alkyl, halogen-substituted alkyl, aryl, or halogen- or alkyl-substituted aryl), halogens, and hydrogen.

Metallocene compound (A) represented by Formula (1) is more specifically represented by Formula (2) below, where, for example, the valency of the transition metal is 4:

$$R^2{}_k R^3{}_l R^4{}_m R^5{}_n M \qquad (2)$$

In Formula (2), M is a transition metal as in Formula (1); $R^2$ represents a group (ligand) having a cyclopentadienyl skeleton; $R^3$, $R^4$ and $R^5$ independently are groups having a cyclopentadienyl skeleton or identical to "L" found in Formula (1) excluding those ligands having a cyclopentadienyl skeleton; and k represents an integer of 1 or more, and k+l+m+n=4.

In the present invention, transition metal compounds represented by Formula (3) below can be used as metallocene compounds (A):

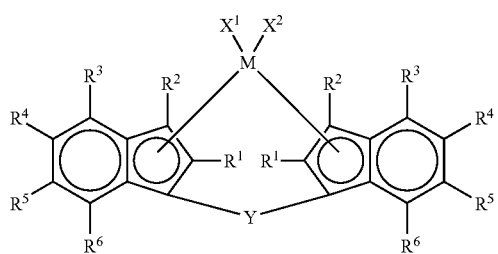

(3)

In Formula (3), M represents a transition metal that belongs to Group 4A of the periodic table. Specifically, M is zirconium, titanium, or hafnium.

In Formula (3), $R^1$ and $R^2$ independently represent hydrogen, halogen, $C_{1-20}$ hydrocarbon group, $C_{1-20}$ halogenated-hydrocarbon group, silicon-containing group, oxygen-containing group, sulfur-containing group, nitrogen-containing group, or phosphorus-containing group. Specific examples are fluorine, chlorine, bromine, iodine, and like halogens; $C_{1-20}$ hydrocarbon groups, such as methyl, ethyl, propyl, butyl, hexyl, cyclohexyl, octyl, nonyl, dodecyl, eicosyl, norbornyl, adamantyl, and like alkyl groups, vinyl, propenyl, cyclohexenyl, and like alkenyl groups, benzyl, phenylethyl, phenylpropyl, and like arylalkyl groups, phenyl, tolyl, dimethylphenyl, trimethylphenyl, ethylphenyl, propylphenyl, biphenyl, naphthyl, methylnaphthyl, anthracenyl, phenanthrenyl, and like aryl groups; halogenated hydrocarbon groups wherein the aforementioned hydrocarbon groups are substituted with halogens; silicon-containing groups such as methylsilyl, phenylsilyl, and like mono-hydrocarbon-substituted silyls, dimethylsilyl, diphenylsilyl, and like di-hydrocarbon-substituted silyls, trimethylsilyl, triethylsilyl, tripropylsilyl, tricyclohexylsilyl, triphenylsilyl, dimethylphenylsilyl, methyldiphenylsilyl, tritolylsilyl, trinaphthylsilyl, and like tri-hydrocarbon-substituted silyls, trimethylsilyl ether and like silyl ethers of hydrocarbon-substituted silyls, trimethylsilylmethyl and like silicon-substituted alkyls, trimethylsilylphenyl and like silicon-substituted aryls; oxygen-containing groups such as hydroxy groups, methoxy, ethoxy, propoxy, butoxy, and like alkoxy groups, phenoxy, methylphenoxy, dimethylphenoxy, naphthoxy, and like aryloxy groups, phenylmethoxy, phenylethoxy, and like arylalkoxy groups; sulfur-containing groups such as the aforementioned oxygen-containing groups wherein oxygen is substituted with sulfur; nitrogen-containing groups such as amino groups, methylamino, dimethylamino, diethylamino, dipropylamino, dibutylamino, dicyclohexylamino, and like alkylamino groups, phenylamino, diphenylamino, ditolylamino, dinaphtylamino, methylphenylamino, and like arylamino or alkylarylamino groups; phosphorus-containing groups such as dimethylphosphino and like phosphino groups; and the like.

In Formula (3), $R^1$ is preferably a hydrocarbon group and especially it is preferably a $C_{1-3}$ hydrocarbon group, i.e., methyl, ethyl, or propyl. $R^2$ is preferably hydrogen or a hydrocarbon group, and especially it is preferably hydrogen or a $C_{1-3}$ hydrocarbon group, i.e., methyl, ethyl, or propyl.

In Formula (3), $R^3$, $R^4$, $R^5$, and $R^6$ independently represent hydrogen, halogen, $C_{1-20}$ hydrocarbon group, or $C_{1-20}$ halogenated hydrocarbon group. Among $R^3$, $R^4$, $R^5$, and $R^6$, two groups, including $R^3$, are preferably alkyl groups. Moreover, it is preferable that $R^3$ and $R^5$, or $R^3$ and $R^6$, are alkyl groups. These alkyl groups may be substituted with halogens, silicon-containing groups or the like. Examples of halogens and silicon-containing groups include those substituents described in connection with $R^1$ and $R^2$ above.

In Formula (3), among the groups represented by $R^3$, $R^4$, $R^5$ and $R^6$, those groups other than alkyl groups are preferably hydrogen. Examples of $C_{1-20}$ hydrocarbon groups include methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl, adamantyl, and like linear or cyclic alkyl groups; benzyl, phenylethyl, phenylpropyl, tolylmethyl, and like arylalkyl groups; and the like. They may contain double or triple bond(s).

In Formula (3), two groups selected from $R^3$, $R^4$, $R^5$ and $R^6$ may be joined, forming a non-aromatic monocyclic ring or polycyclic ring.

In Formula (3), $X^1$ and $X^2$ independently represent hydrogen, halogen, $C_{1-20}$ hydrocarbon group, $C_{1-20}$ halogenated hydrocarbon group, oxygen-containing group, or sulfur-containing group. Specifically, examples thereof include halogens, $C_{1-20}$ hydrocarbon groups, $C_{1-20}$ halogenated hydrocarbon groups, oxygen-containing groups, and the like, as described in regard to $R^1$ and $R^2$ above.

Examples of sulfur-containing groups include those described in connection with $R^1$ and $R^2$ above; methyl sulfonato, trifluoromethane sulfonato, phenyl sulfonato, benzyl sulfonato, p-toluene sulfonato, trimethylbenzene sulfonato, triisobutylbenzene sulfonato, p-chlorobenzene sulfonato, pentafluorobenzene sulfonato, and like sulfonato groups; methyl sulfinato, phenyl sulfinato, benzyl sulfinato, p-toluene sulfinato, trimethylbenzene sulfinato, pentafluorobenzene sulfinato, and like sulfinato groups; etc.

In Formula (3), Y represents $C_{1-20}$ divalent hydrocarbon group, $C_{1-20}$ divalent halogenated hydrocarbon group, divalent silicon-containing group, divalent germanium-containing group, divalent tin-containing group, —O—, —CO—, —S—, —SO—, —SO$_2$—, —NR$^7$—, —P(R$^7$)—, —P(O)(R$^7$)—, —BR$^7$—, or —AlR$^7$— where $R^7$ represents hydrogen, halogen, $C_{1-20}$ hydrocarbon group, or $C_{1-20}$ halogenated hydrocarbon group. Specific examples include $C_{1-20}$ divalent hydrocarbon groups such as methylene, dimethylmethylene, 1,2-ethylene, dimethyl-1,2-ethylene, 1,3-trimethylene, 1,4-tetramethylene, 1,2-cyclohexylene, 1,4-dicyclohexylene, and like alkylene groups, diphenyl methylene, diphenyl-1,2-ethylene, and like arylalkylene groups, and the like; halogenated hydrocarbon groups wherein the aforementioned $C_{1-20}$ divalent hydrocarbon groups are halogenated, such as chloromethylene and the like; divalent silicon-containing groups such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene, and di(p-chlorophenyl)silylene, and like alkylsilylenes, alkylarylsilylenes, arylsilylenes, tetramethyl-1,2-disilylene, tetraphenyl-1,2-disilylene, and like alkyldisilylenes, alkylaryldisilylenes, aryldisilylenes, and the like; divalent germanium-containing groups wherein silicon in the aforementioned silicon-containing groups is substituted with germanium; divalent tin-containing groups wherein silicon in the aforementioned silicon-containing groups is substituted with tin; and the like. $R^7$ is halogen, $C_{1-20}$ hydrocarbon group, or $C_{1-20}$ halogenated hydrocarbon group as described in connection with $R^1$ and $R^2$ above.

Among the examples above, Y is preferably a divalent silicon-, germanium-, or tin-containing group, more preferably a divalent silicon-containing group, and especially preferably alkylsilylene, alkylarylsilylene, or arylsilylene.

In Formula (3), the preferable combination of $R^1$ to $R^6$ is that $R^1$ is a hydrocarbon group, $R^3$ is a $C_{6-16}$ aryl, and $R^2$, $R^4$, $R^5$ and $R^6$ are hydrogen. In this case, $X^1$ and $X^2$ are preferably halogen or $C_{1-20}$ hydrocarbon groups.

Preferable examples of hydrocarbon group represented by $R^1$ are $C_{1-4}$ hydrocarbon groups, e.g., methyl, ethyl, propyl, and butyl. Examples of $C_{6-16}$ aryl represented by $R^3$ include phenyl, α-naphthyl, β-naphthyl, anthracenyl, phenanthrenyl, pyrenyl, acenaphthyl, phenalenyl (perinaphthenyl), aceanthrylenyl, etc. Among these compounds, phenyl and naphthyl are preferable. These aryl groups may be substituted with halogens, $C_{1-20}$ hydrocarbon groups, or $C_{1-20}$ halogenated hydrocarbon groups as described in connection with $R^1$.

Specific examples of metallocene compounds (A) illustrating combinations of $R^1$ to $R^6$ are rac-dimethylsilylene-bis(4-phenyl-1-indenyl)zirconium dichloride, rac-dimethylsilylene-bis(2-methyl-4-phenyl-1-indenyl)zirconium dichloride, rac-dimethylsilylene-bis[2-methyl-4-(α-naphthyl)-1-indenyl]zirconium dichloride, rac-dimethylsilylene-bis[2-methyl-4-(β-naphthyl)-1-indenyl]zirconium dichloride, rac-dimethylsilylene-bis[2-methyl-4-(1-anthracenyl)-1-indenyl]zirconium dichloride, etc.

Among the metallocene compounds having the structures described above, preferable are as follows: rac-dimethylsilylene-bis[1-(2-methyl-4-phenylindenyl)]zirconium dichloride, rac-dimethylsilylene-bis[1-(2-ethyl-4-phenylindenyl)] zirconium dichloride, rac-dimethylsilylene-bis[1-[2-ethyl-4-(α-naphthyl)indenyl]]zirconium dichloride, rac-dimethylsilylene-bis[1-[2-ethyl-4-(β-naphthyl)indenyl]] zirconium dichloride, rac-dimethylsilylene-bis[1-[2-ethyl-4-(2-methyl-1-naphthyl) indenyl]]zirconium dichloride, rac-dimethylsilylene-bis[1-[2-ethyl-4-(5-acenaphthyl)indenyl]] zirconium dichloride, rac-dimethylsilylene-bis[1-[2-ethyl-4-(9-anthracenyl)indenyl]]zirconium dichloride, rac-dimethylsilylene-bis[1-[2-ethyl-4-(9-phenanthrenyl) indenyl]]zirconium dichloride, rac-dimethylsilylene-bis[1-[2-ethyl-4-(o-methylphenyl)indenyl]]zirconium dichloride, rac-dimethylsilylene-bis[1-[2-ethyl-4-(m-methylphenyl)indenyl]]zirconium dichloride, rac-dimethylsilylene-bis[1-[2-ethyl-4-(p-methylphenyl)indenyl]]zirconium dichloride, rac-dimethylsilylene-bis[1-[2-ethyl-4-(2,3-dimethylphenyl) indenyl]]zirconium dichloride, rac-dimethylsilylene-bis[1-[2-ethyl-4-(2,4-dimethylphenyl)indenyl]]zirconium dichloride, rac-dimethylsilylene-bis[1-[2-ethyl-4-(2,5-dimethylphenyl)indenyl]]zirconium dichloride, rac-dimethylsilylene-bis[1-[2-ethyl-4-(2,4,6-trimethylphenyl) indenyl]]zirconium dichloride, rac-dimethylsilylene-bis[1-[2-ethyl-4-(o-chlorophenyl)indenyl]]zirconium dichloride, rac-dimethylsilylene-bis[1-[2-ethyl-4-(m-chlorophenyl)indenyl]]zirconium dichloride, rac-dimethylsilylene-bis[1-[2-ethyl-4-(p-chlorophenyl) indenyl]]zirconium dichloride, rac-dimethylsilylene-bis[1-[2-ethyl-4-(2,3-dichlorophenyl) indenyl]]zirconium dichloride, rac-dimethylsilylene-bis[1-[2-ethyl-4-(2,6-dichlorophenyl)indenyl]]zirconium dichloride, rac-dimethylsilylene-bis[1-[2-ethyl-4-(3,5-dichlorophenyl)indenyl]]zirconium dichloride, rac-dimethylsilylene-bis[1-[2-ethyl-4-(2-bromophenyl) indenyl]]zirconium dichloride, rac-dimethylsilylene-bis[1-[2-ethyl-4-(3-bromophenyl)indenyl]]zirconium dichloride, rac-dimethylsilylene-bis[1-[2-ethyl-4-(4-bromophenyl)indenyl]]zirconium dichloride, rac-dimethylsilylene-bis[1-[2-ethyl-4-(4-biphenylyl)indenyl]]zirconium dichloride, rac-dimethylsilylene-bis[1-[2-ethyl-4-(4-trimethylsilylphenyl) indenyl]]zirconium dichloride, rac-dimethylsilylene-bis[1-(2-n-propyl-4-phenylindenyl)]zirconium dichloride, rac-dimethylsilylene-bis[1-[2-n-propyl-4-(α-naphthyl)indenyl]] zirconium dichloride, rac-dimethylsilylene-bis[1-[2-n-propyl-4-(β-naphthyl)indenyl]]zirconium dichloride, rac-dimethylsilylene-bis[1-[2-n-propyl-4-(2-methyl-1-naphthyl)indenyl]]zirconium dichloride, rac-dimethylsilylene-bis[1-[2-n-propyl-4-(5-acenaphthyl) indenyl]]zirconium dichloride, rac-dimethylsilylene-bis[1-[2-n-propyl-4-(9-anthracenyl)indenyl]]zirconium dichloride, rac-dimethylsilylene-bis[1-[2-n-propyl-4-(9-phenanthrenyl)indenyl]]zirconium dichloride, rac-dimethylsilylene-bis[1-[2-i-propyl-4-phenylindenyl]]zirconium dichloride, rac-dimethylsilylene-bis[1-[2-i-propyl-4-(α-naphthyl)indenyl]]zirconium dichloride, rac-dimethylsilylene-bis[1-[2-i-propyl-4-(β-naphthyl)indenyl]]zirconium dichloride, rac-dimethylsilylene-bis[1-[2-i-propyl-4-(2-methyl-1-naphthyl)indenyl]]zirconium dichloride, rac-dimethylsilylene-bis[1-[2-i-propyl-4-(5-acenaphthyl)indenyl]]zirconium dichloride, rac-dimethylsilylene-bis[1-[2-i-propyl-4-(9-anthracenyl)indenyl]] dichloride, rac-dimethylsilylene-bis[ 1-[2-i-propyl-4-(9-phenanthrenyl) indenyl]]zirconium dichloride, rac-dimethylsilylene-bis[1-[2-s-butyl-4-phenylindenyl]]zirconium dichloride, rac-dimethylsilylene-bis[1-[2-s-butyl-4-(α-naphthyl)indenyl]] zirconium dichloride, rac-dimethylsilylene-bis[1-[2-s-butyl-4-(β-naphthyl)indenyl]]zirconium dichloride, rac-dimethylsilylene-bis[1-[2-s-butyl-4-(8-methyl-9-naphthyl) indenyl]]zirconium dichloride, rac-dimethylsilylene-bis[1-[2-s-butyl-4-(5-acenaphthyl)indenyl]]zirconium dichloride, rac-dimethylsilylene-bis[1-[2-s-butyl-4-(9-anthracenyl)indenyl]]zirconium dichloride, rac-dimethylsilylene-bis[1-[2-s-butyl-4-(9-phenanthrenyl)indenyl]]zirconium dichloride, rac-dimethylsilylene-bis[1-[2-n-pentyl-4-phenylindenyl]] zirconium dichloride, rac-dimethylsilylene-bis[1-[2-n-pentyl-4-(α-naphthyl)indenyl]]zirconium dichloride, rac-dimethylsilylene-bis[1-[2-n-butyl-4-phenylindenyl]]zirconium dichloride, rac-dimethylsilylene-bis[1-[2-n-butyl-4-(α-naphthyl)indenyl]]zirconium dichloride, rac-dimethylsilylene-bis[1-[2-n-butyl-4-(β-naphthyl)indenyl]]zirconium dichloride, rac-dimethylsilylene-bis[1-[2-n-butyl-4-(2-methyl-1-naphthyl)indenyl]]zirconium dichloride, rac-dimethylsilylene-bis[ 1-[2-n-butyl-4-(5-acenaphthyl)indenyl]]zirconium dichloride, rac-dimethylsilylene-bis[1-[2-n-butyl-4-(9-anthracenyl)indenyl]]zirconium dichloride, rac-dimethylsilylene-bis[1-[2-n-butyl-4-(9-phenanthrenyl) indenyl]]zirconium dichloride, rac-dimethylsilylene-bis[1-(2-i-butyl-4-phenylindenyl)]zirconium dichloride, rac-dimethylsilylene-bis[1-[2-i-butyl-4-(α-naphthyl)indenyl]] zirconium dichloride, rac-dimethylsilylene-bis[1-[2-i-butyl-4-(β-naphthyl)indenyl]]zirconium dichloride, rac-dimethylsilylene-bis[1-[2-i-butyl-4-(2-methyl-1-naphthyl) indenyl]]zirconium dichloride, rac-dimethylsilylene-bis[1-[2-i-butyl-4-(5-acenaphthyl)indenyl]]zirconium dichloride, rac-dimethylsilylene-bis[1-[2-i-butyl-4-(9-anthracenyl)indenyl]]zirconium dichloride, rac-dimethylsilylene-bis[1-[2- i-butyl-4-(9-phenanthrenyl)indenyl]]zirconium dichloride, rac-dimethylsilylene-bis[1-(2-neopentyl-4-phenylindenyl)] zirconium dichloride, rac-dimethylsilylene-bis[1-[2-neopentyl-4-(α-naphthyl)indenyl]]zirconium dichloride, rac-dimethylsilylene-bis[1-(2-n-hexyl-4-phenyl indenyl)] zirconium dichloride, rac-dimethylsilylene-bis[1-[2-n-hexyl-4-(α-naphthyl)indenyl]]zirconium dichloride, rac-methylphenylsilylene-bis[1-(2-ethyl-4-phenylindenyl)] zirconium dichloride, rac-methylphenylsilylene-bis[1-[2-ethyl-4-(α-naphthyl)indenyl]]zirconium dichloride, rac-methylphenylsilylene-bis[1-[2-ethyl-4-(9-anthracenyl) indenyl]]zirconium dichloride, rac-methylphenylsilylene-bis[1-[2-ethyl-4-(9-phenanthrenyl)indenyl]]zirconium dichloride, rac-diphenylsilylene-bis[1-(2-ethyl-4-phenylindenyl)]zirconium dichloride, rac-diphenylsilylene-bis[1-[2-ethyl-4-(α-naphthyl)indenyl]]zirconium dichloride, rac-diphenylsilylene-bis[1-[2-ethyl-4-(9-anthracenyl)indenyl]] zirconium dichloride, rac-diphenylsilylene-bis[1-[2-ethyl-4-(9-phenanthrenyl)indenyl]]zirconium dichloride, rac-diphenylsilylene-bis[1-(2-ethyl-4-(biphenylyl)indenyl)] zirconium dichloride, rac-methylene-bis[1-[2-ethyl-4-phenylindenyl]]zirconium dichloride, rac-methylene-bis[1-[2-ethyl-4-(α-naphthyl)indenyl]]zirconium dichloride, rac-ethylene-bis[1-(2-ethyl-4-phenylindenyl)]zirconium dichloride, rac-ethylene-bis[1-[2-ethyl-4-(α-naphthyl)indenyl]]zirconium dichloride, rac-ethylene-bis[1-[2-n-propyl-4-(α-naphthyl)indenyl]]zirconium dichloride, rac-dimethylgermylene-bis[1-(2-ethyl-4 -phenylindenyl)]zirconium dichloride, rac-dimethylgermylene-bis[1-[2-ethyl-4-(α-naphthyl)indenyl]]zirconium dichloride, rac-dimethylgermylene-bis[1-[2-n-propyl-4-(αnaphthyl)indenyl]]zirconium dichloride, rac-dimethylstannylene-bis[1-(2-ethyl-4-phenylindenyl)]zirconium dichloride, rac-dimethylstannylene-bis[1-[2-ethyl-4-(9-phenanthrenyl)indenyl]]zirconium dichloride, rac-dimethylstannylene-bis[1-(2-n-propyl-4-phenylindenyl)]zirconium dichloride, etc.

Among the metallocene catalysts used in the present invention, known aluminoxane compounds can be used as organo-aluminum-oxy compounds.

Examples of ionic compounds usable as metallocene catalysts in the invention include triphenylcarbenium tetrakis(pentafluorophenyl)borate, tri n-butylammonium tetrakis (pentafluorophenyl)borate, N,N-dimethylanilinium tetrakis (pentafluorophenyl)borate, ferrocenium tetra (pentafluorophenyl)borate, etc.

Examples of methods for polymerizing isotactic polypropylene polymers include suspension polymerization conducted in the presence of a hydrocarbon solvent or propylene solvent, gas-phase polymerization, and similar methods.

The chlorinated polyolefin used herein has a chlorine content of 10 to 40 wt. %. When the chlorine content is lower than 10 wt. %, solubility in solvents is impaired, and good low-temperature flowability cannot be attained. A chlorine content exceeding 40 wt. % is not preferable because adhesion to polyolefins and solvent resistance are compromised. The preferable chlorine content is 20 to 30 wt. %.

The chlorine content of the carboxyl-containing chlorinated polyolefin graft-polymerized with an unsaturated carboxylic acid monomer should also be 10 to 40 wt. %, and preferably 20 to 30 wt. %.

Graft-polymerizing an unsaturated carboxylic acid monomer with an isotactic polypropylene polymer can be conducted according to known methods, e.g., a polyolefin is brought to reaction by heating it in the presence of a radical generator to a temperature above its melting point and fusing it (fusion method), or by dissolving a polyolefin in an organic solvent and heating and stirring it in the presence of a radical generator (solution method).

The fusion method provides the advantage of easy operation and quick reaction because a Banbury mixer, kneader, extruder, or like equipment is used and the reaction is conducted at temperatures higher than the melting point up to 300° C. In the solution method, it is preferable to use toluene, xylene, or a similar aromatic solvent as a reaction solvent. A reaction temperature of 100 to 180° C. and reaction time of 1 to 5 hours causes few side reactions and provides uniform graft polymers.

Examples of radical generators usable in the reaction include di-tert-butyl perphthalate, tert-butyl hydroperoxide, dicumyl peroxide, benzoyl peroxide, tert-butyl peroxybenzoate, tert-butyl peroxypivalate, methylethyl-ketone peroxide, di-tert-butyl peroxide, and like peroxides; azobisisobutyronitrile, azobisisopropionitrile, and like azonitriles; etc.

Examples of unsaturated carboxylic acid monomers usable in the reaction include maleic acid, maleic anhydride, fumaric acid, citraconic acid, citraconic anhydride, mesaconic acid, itaconic acid, itaconic anhydride, aconitic acid, aconitic anhydride, himic anhydride, etc.

The grafting ratio of the unsaturated carboxylic acid monomer is 1 to 10 wt. %. When it is less than 1 wt. %, sufficient adhesion cannot be attained since the content of polar group in the composition becomes excessively low. When it is more than 10 wt. %, gelation occurs during chlorination.

A method for graft-polymerizing an unsaturated carboxylic acid monomer with a chlorinated polyolefin produced by chlorinating an isotactic polypropylene polymer can be conducted according to the solution method described above. The preferable reaction temperature is 60 to 120° C. Excessively low temperatures are not preferable since the reaction proceeds slowly, and excessively high temperatures are also not preferable because the chlorinated polyolefin decomposes. The grafting ratio of the unsaturated carboxylic acid monomer is 1 to 10 wt. %. When the grafting ratio is less than 1 wt. %, the content of polar group in the composition becomes too small, resulting in insufficient adhesion, and a grafting ratio more than 10 wt. % results in impaired properties. Polyolefins can be readily chlorinated according to known methods. For example, a polyolefin resin (an isotactic polypropylene polymer, or a carboxyl-containing polyolefin produced by grafting an unsaturated carboxylic acid monomer with such an isotactic polypropylene polymer) is brought to reaction by dissolving in a chlorination solvent, and injecting chlorine gas at a temperature of 50 to 150° C., in the presence of a catalyst or under UV irradiation, under ambient or increased pressure.

Catalysts usable in the chlorination reaction include, for example, tert-butylperoxy-2-ethylhexanoate, di-tert-butyl peroxide, benzoyl peroxide, dicumyl peroxide, tert-butyl-cumyl peroxide, dilauryl peroxide, tert-butyl hydroperoxide, cyclohexanone peroxide, tert-butyl peroxybenzoate, cumene hydroperoxide, tert-butyl peroxyisobutylate, and similar peroxides; azobisisobutyronitrile, azobisisopropionitrile, and like azonitriles; etc.

Examples of solvents for use in the chlorinating reaction include halogenated solvents such as tetrachloroethylene, chloroform and like halogenated hydrocarbons. Chloroform is especially preferable.

During production of the binder resin solution composition of the present invention, the aforementioned chlorinated polyolefins may be solidified, dried, and dissolved in an organic solvent. Alternatively, after the chlorination reaction, the chlorination solvent is removed by distillation and replaced with the organic solvent.

The solid content of the binder resin solution composition is 10 to 50 wt. %. A solid content less than 10 wt. % poses problems such as difficult pigment dispersion when the solution composition is processed into inks and coatings, high transportation costs, and other problems. A solid content more than 50 wt. % is not preferable because the impaired low-temperature flowability greatly limits handling during winter low temperatures. The preferable solid content is 20 to 40 wt. %.

Toluene, xylene, or a similar aromatic organic solvent is preferable as the organic solvent used in the binder resin solution composition of the invention.

A feature of the present invention is to further improve properties of weakly chlorinated polyolefins, which have good adhesion to polyolefins. In particular, although weakly chlorinated polyolefins by nature exhibit better adhesion to polyolefins and improved solvent resistance as their chlorine content is lowered, properties of the solutions thereof are deteriorated, resulting in thickening/gelation during storage and impaired low-temperature flowability. Accordingly, coating workability during spray coating and the like is significantly deteriorated and handling properties during winter low temperatures are greatly impaired. However, a binder resin solution composition, as disclosed herein, comprising as a resin component a weakly chlorinated polyolefin, obtained by chlorinating an isotactic polypropylene polymer having a molecular weight distribution of no more than 3 and a melting point measured by a differential scanning calorimeter of 110 to 140° C., has excellent solution quality and low-temperature flowability, as well as excellent solvent resistance and adhesion to polyolefins.

The binder resin solution composition of the present invention can be used as a binder composition for a coating for polyolefin films, sheets, molded articles, and the like, as well as a binder composition for inks, adhesives, etc. Furthermore, such a composition containing a carboxyl-containing chlorinated polyolefin produced by graft-polymerizing an unsaturated carboxylic acid monomer can be used as a primer for coating polyolefin bumpers.

Although the binder resin solution composition of the invention can be applied as a coating per se, it can also be used as a coating or ink by mixing with a pigment, a solvent, or other additives. While the binder resin provides a coating film with well-balanced properties, it can further be used in combination with alkyd resins, acrylic resins, polyacryl polyols, polyester resins, polyester polyols, polyether resins, polyether polyols, polyurethane resins, chlorinated polyolefins, etc., as required.

The binder resin solution composition of the invention, because it achieves excellent solvent resistance and adhesion to polyolefin products without impairing the low-temperature flowability and workability of weakly chlorinated polyolefins, can be used as a binder resin solution composition for coatings, primers, printing inks, or adhesives.

BEST MODE FOR CARRYING OUT THE INVENTION

Examples are given below to illustrate the invention in more detail, but the scope of the invention is not limited to these examples.

EXAMPLE 1

Polymerization was carried out over 30 minutes by introducing 900 ml of hexane into a 2-liter autoclave sufficiently charged with nitrogen, adding thereto 1 mmol of triisobutylaluminum, heating to 70° C., supplying propylene and ethylene to adjust the total pressure to 0.71 MPa, adding 0.30 mmol of methylaluminoxane and 0.001 mmol (calculated as a Zr atom) of rac-dimethylsilylene-bis[1-(2-methyl-4-phenylindenyl)]zirconium dichloride, and continuously supplying propylene and ethylene to maintain 0.71 MPa total pressure. After polymerization and deaeration, an isotactic propylene-ethylene random copolymer was recovered in an excess of methanol, and dried under reduced pressure for 12 hours at 110° C.

The isotactic propylene-ethylene random copolymer thus obtained (hereinafter referred to as PE-1) exhibited a melt flow rate of 10 g/10 min (ASTM 1238: 230° C., 2.16 kg load), ethylene content of 4.0 mol % (2.7 wt. %), Mw/Mn of 2.6, and Tm of 131° C.

PE-1 (280 g) and chloroform (2520 g) were introduced into an autoclave equipped with a stirrer. After charging with nitrogen for about 5 minutes, the autoclave was heated to 110° C. to sufficiently fuse the resin. Subsequently, 1.4 g of tert-butylperoxy-2-ethylhexanoate was added and chlorine gas was injected to acquire 3 reaction solutions each having a different chlorine content. The reaction solvent, i.e., chloroform, was distilled off under reduced pressure, and toluene was added to dissolve, thereby producing toluene solutions of chlorinated polyolefin having a chlorine content of 15 wt. %, 20 wt. %, and 25 wt. %, respectively, and a solid content of 20 wt. % each.

EXAMPLE 2

In a similar manner to the first part of Example 1, an isotactic propylene-ethylene random copolymer (hereinafter referred to as PE-2) was produced that exhibited a melt flow rate of 3 g/10 min (ASTM 1238: 230° C., 2.16 kg load), ethylene content of 6.2 mol % (4.2 wt. %), Mw/Mn of 2.0, and Tm of 117° C.

PE-2 was chlorinated as in the latter half of Example 1 to obtain toluene solutions of chlorinated polyolefin having a chlorine content of 15 wt. %, 20 wt. %, and 25 wt. %, respectively, and a solid content of 20 wt. % each.

COMPARATIVE EXAMPLE 1

A polypropylene (hereinafter referred to as PP-1) produced in the presence of a titanium catalyst was chlorinated as in Example 1 to obtain toluene solutions of chlorinated polypropylene having a chlorine content of 15 wt. %, 20 wt. %, and 25 wt. %, respectively, and a solid content of 20 wt. % each.

COMPARATIVE EXAMPLE 2

A crystalline propylene-ethylene random copolymer (ethylene content: 4.0 mol % (2.7 wt. %); hereinafter referred to as PE-3) produced in the presence of a titanium catalyst was chlorinated as in Example 1 to obtain toluene solutions of chlorinated polyolefin having a chlorine content of 15 wt. %, 20 wt. %, and 25 wt. %, respectively, and a solid content of 20 wt. % each.

COMPARATIVE EXAMPLE 3

A crystalline propylene-ethylene random copolymer (ethylene content: 5.9 mol % (4.0 wt. %); hereinafter referred to as PE-4) produced in the presence of a titanium catalyst was chlorinated as in Example 1 to obtain toluene solutions of chlorinated polyolefin having a chlorine content of 15 wt. %, 20 wt. %, and 25 wt. %, respectively, and a solid content of 20 wt. % each.

EXAMPLE 3

Graft polymerization was conducted over 5 hours by introducing 280 g of PE-1, 16.8 g of maleic anhydride, 5.6 g of di-tert-butyl peroxide and 420 g of toluene into an autoclave equipped with a stirrer, charging with nitrogen for about 5 minutes, and heating and stirring at 140° C. After the reaction, the reaction solution was introduced into an excess of methyl ethyl ketone to precipitate the resin. The resin thus obtained was further washed with methyl ethyl ketone several times to remove unreacted maleic anhydride. After drying under reduced pressure, the thus-obtained maleic anhydride-modified polyolefin was chlorinated as in Example 1 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

EXAMPLE 4

PE-2 was subjected to reaction according to the method described in Example 3 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

COMPARATIVE EXAMPLE 4

PP-1 was brought to reaction as in Example 3 to obtain toluene solutions of maleic anhydride-modified chlorinated polypropylene having a chlorine content of 10 wt. %, 15 wt. %, 20 wt. %, and 25 wt. %, respectively, and a solid content of 20 wt. % each.

COMPARATIVE EXAMPLE 5

PE-3 was reacted as in Example 3 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

COMPARATIVE EXAMPLE 6

PE-4 was subjected to reaction as in Example 3 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

COMPARATIVE EXAMPLE 7

A syndiotactic polypropylene (trade name: CHIARO, manufactured by Mitsui Chemicals, Inc.) produced in the presence of a metallocene catalyst was brought to reaction as in Example 3 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

EXAMPLE 5

PE-1 was chlorinated as in Example 1 to obtain toluene solutions of chlorinated polyolefin having a chlorine content of 10 wt. %, 15 wt. %, 20 wt. %, and 25 wt. %, respectively, and a solid content of 20 wt. % each. These toluene solutions of chlorinated polyolefin (350 g each) were introduced into three-neck flasks equipped with a stirrer, dropping funnel, thermometer, and refluxer. Maleic anhydride (1 g) was introduced into each flask. After heating the reaction system to 80° C. in an oil bath maintained at a specific temperature, 0.5 g of benzoyl peroxide diluted with 5 ml of toluene was added dropwise via the dropping funnel over a period of about 10 minutes. After dropwise addition, reaction was carried out for 5 hours by stirring while maintaining the reaction system at 80° C. After reaction, the reaction solutions were cooled and treated with toluene, thereby yielding toluene solutions of maleic anhydride-modified chlorinated polyolefin each having a solid content of 20 wt. %.

EXAMPLE 6

PE-2 was brought to reaction as in Example 5 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

Chlorinated polyolefin solutions obtained in Examples 1 to 6 and Comparative Examples 1 to 7 were investigated for the following properties:

(1) Low-Temperature Flowability

Tables 1 and 2 show a property (low-temperature flowability) of the chlorinated polyolefin solutions obtained in Examples 1 to 6 and Comparative Examples 1 to 7 after storing each chlorinated polyolefin solution for 10 days in the air at 5° C., −5° C., or −10° C., wherein A means "flowable" and B refers to "not flowable (gelated)".

(2) Gasoline Resistance

The viscosity of the chlorinated polyolefin solutions obtained in Examples 1 to 6 and Comparative Examples 1 to 7 was adjusted by toluene so that the drain time using a Ford cup #4 was 12 sec/20° C. These solutions were spray-coated onto polypropylene boards (produced by press-molding SB-E3 manufactured by Mitsui Chemicals, Inc., according to known method; 100 mm×50 mm; thickness: 2 mm) washed with isopropyl alcohol, and dried at 80° C. for 10 minutes. A two-component urethane coating was further spray-coated thereon in an amount of 50 to 60 g/m², and the boards were dried for about 10 minutes at room temperature and for 45 minutes at 80° C. Testing was conducted on the polypropylene boards after being left for 24 hours at room temperature. The coated polypropylene boards were scratched through to the underlying board surface, and immersed for 2 hours in conventional unleaded gasoline maintained at 20° C., after which the condition of the coatings was examined. Results are shown in Tables 1 and 2.

(3) Interlaminar Adhesion

Polypropylene boards coated as in (2) above using the maleic anhydride-modified chlorinated polyolefin solutions obtained in Examples 3 to 6 and Comparative Examples 4 to 7 were provided with a grid pattern of hundred 1-mm squares that reach the underlying board surface. An adhesive cellophane tape was placed on the grid, the tape was peeled perpendicular to the coated surface, and the number of squares that were not peeled away with the tape was counted. Table 2 shows the results.

(4) Interlaminar Adhesion after Immersion in Warm Water

Polypropylene boards coated as in (2) above using the maleic anhydride-modified chlorinated polyolefin solutions obtained in Examples 3 to 6 and Comparative Examples 4 to 7 were immersed in warm water maintained at 40° C. for 240 hours and subjected to the same examination as in (3) above. Table 2 shows the results.

(5) Gasohol Resistance

Polypropylene boards coated as in (2) above using the maleic anhydride-modified chlorinated polyolefin solutions obtained in Examples 3 to 6 and Comparative Examples 4 to 7 were immersed in gasohol (conventional unleaded gasoline:ethanol=90:10 (weight ratio)) maintained at 20° C. for 120 minutes, and the condition of the coatings was examined. Table 2 shows the results.

TABLE 1

|  | Chlorine content (Wt. %) | Low-temperature flowability 5° C. | −5° C. | −10° C. | Gasoline resistance |
|---|---|---|---|---|---|
| Example 1 | 15 | A | B | B | No peeling |
|  | 20 | A | A | B | No peeling |
|  | 25 | A | A | A | No peeling |
| Example 2 | 15 | A | B | B | No peeling |
|  | 20 | A | A | B | No peeling |
|  | 25 | A | A | A | No peeling |
| Comparative Example 1 | 15 | B | B | B | No peeling |
|  | 20 | B | B | B | No peeling |
|  | 25 | A | B | B | Peeling |
| Comparative Example 2 | 15 | B | B | B | No peeling |
|  | 20 | A | B | B | No peeling |
|  | 25 | A | A | B | Peeling |
| Comparative Example 3 | 15 | B | B | B | No peeling |
|  | 20 | A | B | B | No peeling |
|  | 25 | A | A | B | Peeling |

Analysis of the Results Provided in Table 1

In Example 1, an isotactic polypropylene polymer having a molecular weight distribution of 2.6 and a melting point measured by a differential scanning calorimeter of 131° C. was chlorinated and dissolved in an organic solvent. In Example 2, an isotactic polypropylene polymer having a molecular weight distribution of 2.0 and a melting point measured by a differential scanning calorimeter of 117° C. was chlorinated and dissolved in an organic solvent. In Comparative Examples 1, 2 and 3, chlorinated polyolefins were dissolved in an organic solvent. The solutions of Examples 1 and 2 are clearly superior to those of Comparative Examples 1, 2 and 3 in low-temperature flowability. Moreover, the polymers of Examples 1 and 2 are also superior in gasoline resistance.

TABLE 2

|  | Chlorine content (Wt. %) | Low-temperature flowability 5° C. | −5° C. | −10° C. | Interlaminar adhesion | Interlaminar adhesion after immersion in warm water | Gasoline resistance | Gasohol resistance |
|---|---|---|---|---|---|---|---|---|
| Ex. 3 | 10 | A | B | B | 100 | 100 | No peeling | No peeling |
|  | 15 | A | B | B | 100 | 100 | No peeling | No peeling |
|  | 20 | A | A | A | 100 | 100 | No peeling | No peeling |
|  | 25 | A | A | A | 90 | 90 | No peeling | No peeling |
| Ex. 4 | 10 | A | B | B | 100 | 100 | No peeling | No peeling |
|  | 15 | A | B | B | 100 | 100 | No peeling | No peeling |
|  | 20 | A | A | A | 100 | 100 | No peeling | No peeling |
|  | 25 | A | A | A | 95 | 100 | No peeling | No peeling |
| Ex. 5 | 10 | A | B | B | 100 | 100 | No peeling | No peeling |
|  | 15 | A | B | B | 100 | 100 | No peeling | No peeling |
|  | 20 | A | A | A | 100 | 100 | No peeling | No peeling |
|  | 25 | A | A | A | 85 | 90 | No peeling | No peeling |
| Ex. 6 | 10 | A | B | B | 100 | 100 | No peeling | No peeling |
|  | 15 | A | B | B | 100 | 100 | No peeling | No peeling |
|  | 20 | A | A | A | 100 | 100 | No peeling | No peeling |
|  | 25 | A | A | A | 90 | 90 | No peeling | No peeling |
| Comp. Ex. 4 | 10 | B | B | B | 100 | 100 | No peeling | No peeling |
|  | 15 | B | B | B | 80 | 80 | No peeling | No peeling |
|  | 20 | B | B | B | 75 | 75 | No peeling | No peeling |
|  | 25 | A | A | B | 50 | 60 | Peeling | Peeling |
| Comp. Ex. 5 | 10 | B | B | B | 100 | 100 | No peeling | No peeling |
|  | 15 | B | B | B | 100 | 100 | No peeling | No peeling |
|  | 20 | A | B | B | 100 | 100 | No peeling | No peeling |
|  | 25 | A | A | A | 75 | 75 | Peeling | Peeling |
| Comp. Ex. 6 | 10 | B | B | B | 100 | 100 | No peeling | No peeling |
|  | 15 | B | B | B | 100 | 100 | No peeling | No peeling |
|  | 20 | A | B | B | 100 | 100 | No peeling | No peeling |
|  | 25 | A | A | A | 75 | 70 | Peeling | Peeling |
| Comp. Ex. 7 | 10 | B | B | B | 90 | 90 | No peeling | Peeling |
|  | 15 | A | B | B | 75 | 80 | Peeling | Peeling |

TABLE 2-continued

| Chlorine content | Low-temperature flowability | | | Interlaminar | Interlaminar adhesion after immersion in | Gasoline | Gasohol |
|---|---|---|---|---|---|---|---|
| (Wt. %) | 5° C. | −5° C. | −10° C. | adhesion | warm water | resistance | resistance |
| 20 | A | A | B | 60 | 65 | Peeling | Peeling |
| 25 | A | A | A | 45 | 40 | Peeling | Peeling |

Analysis of the Results Provided in Table 2

In Example 3, an isotactic polypropylene polymer having a molecular weight distribution of 2.6 and a melting point measured by a differential scanning calorimeter of 131° C. was modified by maleic anhydride and then chlorinated, followed by being dissolved in an organic solvent. In Example 5, an isotactic polypropylene polymer as used in Example 3 was chlorinated and then modified by maleic anhydride, followed by being dissolved in an organic solvent. In Example 4, an isotactic polypropylene polymer having a molecular weight distribution of 2.0 and a melting point measured by a differential scanning calorimeter of 117° C. was modified by maleic anhydride and then chlorinated, followed by being dissolved in an organic solvent. In Example 6, an isotactic polypropylene polymer as used in Example 4 was chlorinated and then modified by maleic anhydride, followed by being dissolved in an organic solvent. In Comparative Examples 4 to 7, polyolefins graft modified with maleic anhydride were chlorinated and dissolved in an organic solvent. In spite of their better low-temperature flowability, the polymers used in Examples 3 to 6 are also superior to those used in Comparative Examples 4, 5 and 6 in terms of coating film properties. Furthermore, the polymers of Examples 3 to 6 are superior to that of Comparative Example 7 in coating film properties. Therefore, the polymers of Examples 3 to 6 can be considered as unprecedented polymers combining outstanding low-temperature flowability and excellent coating film properties.

What is claimed is:

1. A binder resin solution composition having a solid content of 10 to 50 wt. % comprising (a) a chlorinated polyolefin prepared by chlorinating to a chlorine content of 10 to 40 wt. % an isotactic polypropylene polymer having a molecular weight distribution of no more than 3 and a melting point measured by a differential scanning calorimeter of 110 to 140° C. and (b) an organic solvent.

2. A binder resin solution composition having a solid content of 10 to 50 wt. % comprising (a) a carboxyl-containing chlorinated polyolefin prepared by chlorinating to a chlorine content of 10 to 40 wt. % an isotactic polypropylene polymer having a molecular weight distribution of no more than 3 and a melting point measured by a differential scanning calorimeter of 110 to 140° C. to produce a chlorinated polyolefin and graft-polymerizing with the chlorinated polyolefin 1 to 10 wt. % of at least one unsaturated carboxylic acid monomer selected from the group consisting of carboxylic acids and carboxylic acid anhydrides, and (b) an organic solvent.

3. A binder resin solution composition having a solid content of 10 to 50 wt. % comprising (a) a carboxyl-containing chlorinated polyolefin prepared by graft-polymerizing 1 to 10 wt. % of at least one unsaturated carboxylic acid monomer selected from the group consisting of carboxylic acids and carboxylic acid anhydrides with an isotactic polypropylene polymer having a molecular weight distribution of no more than 3 and a melting point measured by a differential scanning calorimeter of 110 to 140° C. to produce a carboxyl-containing polyolefin and chlorinating the carboxyl-containing polyolefin to a chlorine content of 10 to 40 wt. %, and (b) an organic solvent.

4. The binder resin solution composition according to claim 1, wherein the isotactic polypropylene polymer is an isotactic propylene-α-olefin random copolymer.

5. The binder resin solution composition according to claim 2, wherein the isotactic polypropylene polymer is an isotactic propylene-α-olefin random copolymer.

6. The binder resin solution composition according to claim 3, wherein the isotactic polypropylene polymer is an isotactic propylene-α-olefin random copolymer.

7. The binder resin solution composition according to claim 1, wherein the isotactic polypropylene polymer is an isotactic propylene-ethylene random copolymer.

8. The binder resin solution composition according to claim 2, wherein the isotactic polypropylene polymer is an isotactic propylene-ethylene random copolymer.

9. The binder resin solution composition according to claim 3, wherein the isotactic polypropylene polymer is an isotactic propylene-ethylene random copolymer.

10. The binder resin solution composition according to claim 1, wherein the isotactic polypropylene polymer is an isotactic polypropylene.

11. The binder resin solution composition according to claim 2, wherein the isotactic polypropylene polymer is an isotactic polypropylene.

12. The binder resin solution composition according to claim 3, wherein the isotactic polypropylene polymer is an isotactic polypropylene.

13. The binder resin solution composition according to claim 1, wherein the isotactic polypropylene polymer is produced in the presence of a metallocene catalyst.

14. The binder resin solution composition according to claim 2, wherein the isotactic polypropylene polymer is produced in the presence of a metallocene catalyst.

15. The binder resin solution composition according to claim 3, wherein the isotactic polypropylene polymer is produced in the presence of a metallocene catalyst.

16. A coating for a polyolefin film, sheet or molded article, the coating comprising as an active ingredient the binder resin solution composition according to claim 1.

17. A coating for a polyolefin film, sheet or molded article, the coating comprising as an active ingredient the binder resin solution composition according to claim 2.

18. A coating for a polyolefin film, sheet or molded article, the coating comprising as an active ingredient the binder resin solution composition according to claim 3.

19. An ink for a polyolefin film, sheet or molded article, the ink comprising as an active ingredient the binder resin solution composition according to claim 1.

20. An ink for a polyolefin film, sheet or molded article, the ink comprising as an active ingredient the binder resin solution composition according to claim 2.

21. An ink for a polyolefin film, sheet or molded article, the ink comprising as an active ingredient the binder resin solution composition according to claim 3.

22. An adhesive for a polyolefin film, sheet or molded article, the adhesive comprising as an active ingredient the binder resin solution composition according to claim 1.

23. An adhesive for a polyolefin film, sheet or molded article, the adhesive comprising as an active ingredient the binder resin solution composition according to claim 2.

24. An adhesive for a polyolefin film, sheet or molded article, the adhesive comprising as an active ingredient the binder resin solution composition according to claim 3.

25. A primer for coating a polyolefin resin, the primer comprising as an active ingredient the binder resin solution composition according to claim 2.

26. A primer for coating a polyolefin resin, the primer comprising as an active ingredient the binder resin solution composition according to claim 3.

* * * * *